US008158053B2

(12) United States Patent
Bell et al.

(10) Patent No.: US 8,158,053 B2
(45) Date of Patent: *Apr. 17, 2012

(54) REFRACTORY ARTICLES

(75) Inventors: David A. Bell, Stafford (GB); David L. Jones, Birmingham (GB); Kassim Juma, Stafford (GB); Helmut Jaunich, Raesfeld (DE); Andreas Ansorge, Borken (DE); Martin Schmidt, Duisburg (DE)

(73) Assignee: Foseco International Limited, Fazeley, Tamworth, Staffordshire (GB)

( * ) Notice: Subject to any disclaimer, the term of this patent is extended or adjusted under 35 U.S.C. 154(b) by 926 days.

This patent is subject to a terminal disclaimer.

(21) Appl. No.: 11/489,443

(22) Filed: Jul. 20, 2006
(Under 37 CFR 1.47)

(65) Prior Publication Data
US 2009/0123645 A1 May 14, 2009

Related U.S. Application Data

(62) Division of application No. 10/362,751, filed as application No. PCT/GB01/03846 on Aug. 28, 2001, now Pat. No. 7,138,084.

(30) Foreign Application Priority Data

Aug. 31, 2000 (GB) .................................. 0021343.9
Sep. 15, 2000 (GB) .................................. 0022676.1
Oct. 17, 2000 (GB) .................................. 0025411.0
Mar. 29, 2001 (GB) .................................. 0107872.4

(51) Int. Cl.
*C21B 3/04* (2006.01)
(52) U.S. Cl. ..................... 266/44; 266/227; 266/230
(58) Field of Classification Search .................... 266/44, 266/227, 230
See application file for complete search history.

(56) References Cited

U.S. PATENT DOCUMENTS

| 3,090,094 | A | 5/1963 | Schwartzwalder et al. |
| 3,524,548 | A | 8/1970 | McDonald et al. |
| 3,859,421 | A | 1/1975 | Hucke ...................... 423/445 R |
| 3,893,917 | A | 7/1975 | Pryor |
| 4,061,501 | A | 12/1977 | Ivarsson et al. |
| 4,265,659 | A | 5/1981 | Blome |
| 4,387,173 | A | 6/1983 | Henry, Jr. et al. |
| 4,851,304 | A | 7/1989 | Miwa et al. |
| 5,093,289 | A | 3/1992 | Braetsch |
| 5,102,593 | A | 4/1992 | Dötsch et al. |
| 5,124,040 | A | 6/1992 | Hitchings |
| 5,180,409 | A | 1/1993 | Fischer |
| 5,279,737 | A * | 1/1994 | Sekhar et al. ............... 210/490 |
| 5,520,823 | A * | 5/1996 | Jones et al. ................. 210/767 |
| 5,628,939 | A * | 5/1997 | Reiterer et al. ............ 264/29.1 |
| 6,254,998 | B1 | 7/2001 | Tuchinsky .................. 428/567 |
| 6,814,765 | B1 | 11/2004 | Rogers |
| 2006/0264315 | A1* | 11/2006 | Bell et al. ..................... 501/99 |

FOREIGN PATENT DOCUMENTS

| CZ | 274 300 | 7/1992 |
| DE | 32 12 671 A1 | 11/1982 |
| DE | 32 12 671 C2 | 12/1986 |
| DE | 37 21 642 C2 | 8/1989 |
| DE | 39 17 965 C1 | 9/1990 |
| EP | 0 308 928 | 3/1989 |
| EP | 0 510 852 | 1/1992 |
| EP | 0 507 463 A2 | 10/1992 |
| EP | 0 412 673 B1 | 3/1994 |
| EP | 0 708 064 | 10/1995 |
| EP | 0 649 334 B1 | 3/1996 |
| EP | 0 708 064 | 4/1996 |
| GB | 2 027 688 A | 2/1980 |
| GB | 2097777 A * | 11/1982 |
| GB | 2168335 A * | 6/1986 |
| GB | 2168336 A * | 6/1986 |
| GB | 2 227 185 A | 7/1990 |
| JP | 57088019 A * | 6/1982 |
| JP | 63-216933 | 9/1988 |
| JP | 1-141884 | 6/1989 |
| JP | 2-268953 | 11/1990 |
| JP | 5-51278 | 3/1993 |
| JP | 5-270889 | 10/1993 |
| JP | 6-293561 | 10/1994 |
| JP | 7-54032 | 2/1995 |
| JP | 9-10922 | 1/1997 |
| WO | WO 97/45381 | 12/1997 |
| WO | 99 65843 | 12/1999 |

OTHER PUBLICATIONS

Kokai Unexamined Patent Application Bulletin (A); Japanese Patent Office, Laid Open Patent Application No. 9-277035, Oct. 28, 1997 (7 pgs).
English Translation of Czech article "Refractory Articles"; pp. 59-63 & 289-294 (2009) A6.
In Czech only; "3 Technologia A Vlastnosti Ziaruvzdornych Materialov"; pp. 59-63 & 289-294 (2009) A6.
FOSECO Advertisement "Commited to Foundries", Sep. 9, 2005.

(Continued)

*Primary Examiner* — Scott Kastler
(74) *Attorney, Agent, or Firm* — Nixon & Vanderhye

(57) ABSTRACT

A process for making a filter suitable for filtering molten metal comprising (i) forming a slurry comprising (a) particles of a refractory material, (b) a binder and (c) a liquid carrier, (ii) coating a disposable former with a slurry, (iii) drying the coated former, (iv) optionally applying one or more additional coats of a refractory material and/or a binder, optionally with liquid carrier, and drying the one or more additional coats, and (v) firing the coated former to produce the filter, wherein the binder is a carbon rich source selected from one or more of the following classes of materials: pitches, tars and organic polymers that degrade to form carbon on pyrolysis.

12 Claims, No Drawings

OTHER PUBLICATIONS

Wiese et al; "Innovative product development using virtual planning and simulation delivers greater flexibility in the design of gating systems for steel castings"; *WFO Technical Forum*, Dec. 2003.

Aoki et al; "Highly Porous Silicon Carbide Produced by Siliconizing Carbon Preforms"; *School of Materials Science, University of Bath*, Bath UK; pp. 778-779, Dec. 1995.

National Carbon and Graphite and Karbte Brochure; National Carbon Company; p. 8, Dec. 1951.

Black, J.W., et al; "Advanced Reticulated Ceramics for Aluminum Filtration"; presented at *118th Annual TMS Meeting*; Feb. 27 to Mar. 2, 1989, 5pgs.

Lee, J.C., et al; A Study on the Preparation and Characterization of Carbon Fiber Composite Filter; published in 1995, with English Translation.

Strom, L.A., et al; "Novel Applications of Fully Sintered Reticulated Ceramics"; *Mater. Res. Soc. Symp. Proc.*; vol. 371, pp. 321-326 (1995).

Patent Abstracts of Japan; JP06-269622A; "Ceramic Filter for Soot Removal and Recovery"; Sep. 27, 1994; Koichi, et al; (2 pgs).

Patent Abstracts of Japan; JP01242118A2; Porous Ceramic Filter; Sep. 27, 1989, Koichi et al; (2 pgs).

Patent Abstracts of Japan; 60221169A; "Filter Medium for Molten Metal"; Nov. 5, 1985; Chobe (1 pg).

Stelex*Pro "A New Generation for the Filtration of Steel"; Foseco (4 pgs).

Stelex*Pro; "Casting: 76 mm (3") Wire Socket Casting"; Filtration Case Study Steel; Foseco (1 pg).

Hand-book upon filtration (Brno, 2000) (2 pages).

Eurocarbon 2000, World Conference on Carbon (Jul. 2000) (2 pages).

Základy technologie silikátů, Prof. Ing. Jan Hlaváč (Praha 1988) (2 pages).

Technologie, Prof. Ing. Dr. Vladimír Lach (Praha 1981) (2 pages).

Technologie Keramiky, Ing. Karel Zůdrapa (Praha 1975) (2 pages).

* cited by examiner

REFRACTORY ARTICLES

This application is a divisional of application Ser. No. 10/362,751, filed Feb. 26, 2003 now U.S. Pat. No. 7,138,084, which is a 317 of PCT/GB01/03846 filed Aug. 28, 2001, the entire content of which is hereby incorporated by reference in this application.

The present invention relates to refractory articles and to a process for producing refractory articles. The invention particularly relates to refractory articles which are suitable for use in contact with molten metals (including metal alloys) at elevated temperatures. In particular, the present invention relates to a filter suitable for filtering molten metal and to a process for producing such a filter.

Refractory articles (i.e. articles formed from refractory materials) such as vessels, vessel linings, sleeves, pouring cups, filters, moulds, mould cores, etc are used in the handling, pouring and casting of molten metals. Such refractory articles commonly need to be fired at very high temperatures, for example in the region of 1000° C. or higher. Firing at such high temperatures is generally costly and time-consuming. It would therefore be highly desirable to reduce the required firing temperatures of such articles.

Refractory materials comprising carbon, e.g. in the form of complex structures bonded with carbon, have many useful applications, but the manufacture of such materials by known techniques has many associated problems and limitations Known techniques for making carbon-bonded articles include the graphitisation of petroleum pitch and coal tar. These processes require conditions of very high pressure followed by heating to high temperatures in the order of 2,500° C. Such a process is energy inefficient, provides hazardous conditions and can only satisfactorily produce material in sections of several inches in size, e.g. in cross section.

An alternative technique is the direct hot mixing of pitch and tar with other mineral powders such as graphite, refractory powders etc. followed by pressing at high pressure prior to tempering for several days in specially designed kilns at temperatures in the order of 1,400° C. Again such a technique is energy inefficient and can only produce materials of thick section.

A further known technique is the high energy mixing of synthetic resin with mineral powders or graphite in the presence of a cross-linker which results in the conversion of the resin from a thermoplastic to a thermosetting polymer. Subsequent heating in the absence of air to a temperature up to 1,000° C. yields a material which again can only be manufactured with thick cross-section.

A still further process is the use of a sinterable carbon precursor containing meso-phase which on heating to a temperature of up to 1,000° C. can yield a carbon bond structure. However the sinterable carbon used with the precursor is very expensive to manufacture.

EP-A-0708064 discloses the manufacture of fire resistant carbon compound blocks with a magnesium oxide base which are used, for example, for lining furnaces and the vessels used to receive smelted steel. The source of carbon is suitably mesogenous pitch, or polyaromatic compounds mesophase, or mesophase pitch.

DE-A-4307343 discloses binding and impregnating pitches for the manufacture of carbon electrodes and fire resistant materials. The pitches are produced by heating oils, tars or pitches derived from coal or crude oil at a temperature in the range 360 to 540° C. in a substantially inert gas atmosphere at elevated pressure.

WO 99/28273 (Foseco International Limited) discloses a filter for molten metal comprising a porous carbon foam substrate coated substantially throughout with a refractory metal or refractory compound formed by chemical vapour deposition. The filter can be made by pyrolysing a porous organic foam substrate, for example, polyurethane foam or resin-coated polyurethane foam, at a temperature in the range 600 to 1200° C. The porous carbon foam is then coated by vapour phase deposition with a refractory material (e.g. as described in U.S. Pat. Nos. 5,154,970, 5,283,109 and 5,372,380 and in EP-A-0747124.

On the other hand, U.S. Pat. No. 5,104,540 (Corning Incorporated) discloses a carbon-coated porous sintered ceramic filter for molten metal comprising a monolith substrate formed from inorganic refractories such as alumina, mullite, zircon, zirconia, spinel, cordierite, lithium aluminosilicates, titania, feldspars, quartz, fused silica, silicon carbide, kaolin clay, aluminium titanate, silicates, aluminates and mixtures thereof. The carbon coating is applied to the surface of the pre-formed filter or to a thermite coating thereon.

A type of filter for filtering molten metal, which has been extensively employed in the art, comprises an open-cell porous structure comprising refractory particles bound together by an inorganic matrix. Filters of this type can be made, for example, by coating a suitable open-celled foam, e.g., reticulated polyurethane foam, with a composition comprising a slurry of refractory particles (e.g. zirconia), a binder (e.g. a borosilicate glass) and water, drying the coated foam and then firing to produce an open-celled porous filter comprising the refractory particles bound together by a glass matrix. The polyurethane foam generally chars and burns away during the firing process and does not contribute significantly to the properties of the produced filter. Filters of this type are disclosed, for example, in EP-A-0412673 and EP-A-0649334 both in the name of Foseco International Ltd.

It is an object of the present invention to provide an improved filter for filtering molten metal. It is another object of the present invention to provide a process for preparing a filter for filtering molten metal.

Accordingly the present invention comprises a filter suitable for filtering molten metal comprising an open-pored porous material-comprising particles of refractory material embedded in and bonded together by a bonding material comprising a carbon matrix.

The phrase "open-pored porous material" means throughout this specification a material comprising a regular, partly regular, irregular or random distribution of pores within a solid material, the pores providing channels through which a molten metal may flow through the said material. The pores can be fully or partially inter-communicating or can be provided by a plurality of passages which traverse the bulk of the said material to enable molten metal to flow readily therethrough. The pores themselves can be of regular or irregular size and shape. For example, the pores can be provided by a series of parallel ducts passing linearly through the material, the ducts having any desired cross-section, for example, circular, elliptical, triangular, square or pentagonal. Or, for example, the pores can be provided by a random distribution of irregular interconnecting passages, for example, similar to the pore distribution in a natural sponge. A preferred open-pore porous material is one having a fairly regular pore distribution provided by commercially available reticulated open cell polyurethane foams. Such materials are well known in the art for use in the manufacture of refractory filters for the filtration of molten metals.

The refractory material bonded by the bonding material in the present invention can be, for example, any of the well known refractory materials in the art which provide resistance to the corrosive effect and high temperature of the molten metal which it is desired to filter. Examples of refractory materials suitably used in the present invention include: zirconia, zircon, silica, alumina, titania, carbides (e.g. silicon carbide, zirconium carbide, titanium carbide, calcium carbide, aluminium carbide), nitrides (e.g. silicon nitride and aluminium nitride), metal oxides (e.g. nickel oxide and chromic oxide), magnesia, mullite, graphite, anthracite, coke, active carbon, graphite-refractory (e.g. graphite-magnesia, graphite-alumina, graphite-zirconia), or mixtures comprising two or more of these.

The bonding material comprises a carbon matrix which bonds the refractory particles together and in which the particles are embedded in the filter of the present invention. The bonding material is preferably in the form of a coke or semi-coke which is produced by the thermal decomposition of an organic material.

The relative proportions (in percentage by weight) of particulate refractory material to bonding material are preferably in the range at least 50% refractory: no more than 50% bonding material; more preferably they are in the range at least 55% refractory: no more than 45% bonding material; even more preferably they are in the range at least 60% refractory: no more than 40% bonding material, for example approximately 65-75% refractory: approximately 35-25% bonding material.

Filters in accordance with the present invention suitably used for filtering molten steel preferably comprise refractory particles selected from zirconia, zircon, silicon carbide, graphite, alumina and mixtures or two or more thereof.

Filters in accordance with the present invention suitably used for filtering molten iron preferably comprise refractory particles selected from zirconia, zircon, silicon carbide, graphite, alumina, alumino-silicates (e.g. chamotte, pyrophyllite, andalusite) and mixtures of two or more thereof.

Filters in accordance with the present invention suitably used for filtering molten aluminium preferably comprise refractory particles selected from graphite and wollastonite.

The present invention further comprises a process for making a material suitable for filtering molten metal comprising forming into an open-pored porous material a mixture comprising a binder and refractory particles and firing the material, wherein the binder is a carbon-rich source selected from one or more of the following: pitch, tar, and aromatic organic polymer that degrades to form carbon on pyrolysis.

Thus for example, an open-pored porous material can be formed by compressing a mixture of the binder and the refractory particles into a disk or slab in a die and piercing the compressed material with a plurality of needles or rods to create perforations traversing the thickness of the disc or slab. The perforations may have any desired cross-section and are preferably, for example, circular, elliptical, triangular, square or pentagonal. Preferably the piercings are arranged in a regular grid pattern across the surface of the article. A similar type of article can be produced for example by extruding a mixture comprising the binder and the refractory particles, preferably together with a fluid and/or other additives to render the mixture more readily extrudable, through a suitable die equipped with a plurality of mandrels to form perforations in the extruded article. Extrusion of articles having this type of shape is well known in the art.

A preferred method in accordance with the present invention for making an open-pored porous material suitable for filtering molten metal comprises (1.) forming a slurry comprising (a) particles of a refractory material, (b) a binder and (c) a liquid carrier,
(2.) coating a disposable former with the slurry
(3.) drying the coated former,
(4.) optionally applying one or more additional coats of a refractory material and/or a binder, optionally with liquid carrier, and drying the one or more additional coats,
(5.) firing the coated former to produce a porous material, wherein the binder is a carbon-rich source selected from one or more of the following classes of materials: pitches, tars, and organic polymers that degrade to form carbon on pyrolysis.

A further preferred method in accordance with the present invention of making an open-pored porous material suitable for filtering molten metal comprises (1.) forming a slurry comprising (a) particles of a refractory material, (b) a binder and (c) a liquid carrier,
(2.) coating a disposable former with the slurry
(3.) drying the coated former,
(4.) optionally applying one or more additional coats of a refractory material and/or a binder, optionally with liquid carrier, and drying the one or more additional coats,
(5.) firing the coated former to produce a porous material, wherein the binder is a carbon-rich source selected from one or more of the following classes of materials: pitches, tars, and organic polymers that degrade to form carbon on pyrolysis, and wherein (i) the binder has been subjected to stabilisation by pre-treatment with an acid and/or an oxidising agent and/or (ii) a polyfunctional compound is included in the slurry or the coating to promote stabilisation of the binder.

The carbon-rich source is selected from one of more classes of material which comprise pitches, tars and polymers that degrade to form carbon on pyrolysis. Examples of such materials are coal tar, petroleum pitch, asphalt, bitumen, synthetic pitch, synthetic tar, synthetic bitumen; or residues derived from the pyrolysis of coal, crude oil, coal tar, petroleum pitch, asphalt, bitumen, synthetic pitch, synthetic tar or synthetic bitumen. The polymers which are degradable to form carbon on pyrolysis are preferably aromatic organic polymers. Aromatic organic polymer can suitably be any polymer, synthetic or natural, that contains organic aromatic chains, aromatic networks or aromatic substituents, and that degrades on pyrolysis to form a carbonaceous residue. The aromatic chains or substituents are preferably based on benzene rings which may be, for example, pendant from a molecular chain or may be present as part of a molecular chain or network Examples of suitable aromatic polymers are phenyl substituted polymers, ortho-, meta- or para-phenylene polymers, naphthalene polymers, phenanthrene polymers, anthracene polymers, coronene polymers and polymers of like high molecular weight polynuclear aromatic materials. Polymers may be derived from furfuryl alcohol and these can also be employed. Preferred aromatic polymers are phenolic resins derived from the reaction of phenol and formaldehyde. Examples of such resins are resole resins and novolak resins which are well known in the art. Preferably the aromatic polymers are crosslinkable or crosslinked polymers. The aromatic polymers are thermosetting resins in preference to thermoplastic resins.

The refractory materials suitably used in the present invention are already recited above and include zirconia, zircon, silica, alumina, titania, carbides (e.g. silicon carbide, zirconium carbide, titanium carbide, calcium carbide, aluminium carbide), nitrides (e.g. silicon nitride and aluminium nitride), metal oxides (e.g. nickel oxide and chromic oxide), magnesia, mullite, graphite, anthracite, coke, active carbon, graphite-refractory (e.g. graphite-magnesia, graphite-alumina, graphite-zirconia), or mixtures comprising two or more of these.

The particulate refractory material can, for example, comprise a mixture of graphite and another refractory material (e.g. alumina). For example the graphite content of the refractory particles is preferably from zero to 50 weight %, more preferably from 10 to 40 weight % based on the total weight of the refractory particles, the balance being met by one or more other particulate refractory materials.

The particles of refractory material employed in the process of the present invention can be, for example, powders, fines, granules, fibrous materials, or microspheres (hollow and/or solid). Substantially any refractory material filler may be used; the skilled person will be able to select the appropriate material or mixture of materials according to the particular use requirements of the refractory composition or article.

The particle size and the particle size distribution of the refractory particles can vary widely. Generally it is preferred that the particles have a mean particle size less than 30 microns, more preferably less than 10 microns, even more preferably in the range 1-5 microns.

The relative proportions (in percentage by weight) of the particulate refractory material to binder are preferably in the range at least 50% refractory: no more than 50% binder; more preferably they are in the range at least 55% refractory: no more than 45% binder; even more preferably they are in the range at least 60% refractory: no more than 40% binder, for example approximately 65-75% refractory: approximately 35-25% binder The binder used in the process of the present invention is preferably a carbon-rich material that provides a good yield of coke when heated to temperatures in the range of 500 to 700° C.

Preferably the binder is a particulate material. The particle size and the particle size distribution of the binder can vary widely. Generally it is preferred that the particles have a mean particle size less than 50 microns, more preferably less than 30 microns.

The thermal decomposition of coal tar and pitch has been well documented [see for example Rand, B. McEnaney: "Carbon Binders from Polymeric Resins and Pitch Part I—Pyrolysis Behaviour and Structure of the Carbons" Br. Ceram. Trans. J., 84, 57-165 (1985) no. 5]. During firing the pitch first melts then starts to pyrolyse, low molecular weight species are evolved and condensation reactions occur where the aromatic rings of less volatile constituents start to join up (polymerise). On further heating between 300 and 400° C. large sheet-like structures of these polyaromatics are formed which then start stack up on top of one another. The sheets in the stacks are held together by Van der Waals forces. These stacked systems form liquid crystals and separate out of the rest of the liquid pitch as disks or spheres. This liquid crystal phase is called 'mesophase' or intermediate phase. Both coal tar and petroleum pitches produce mesophase, the amount produced being primarily dependent upon the aromatic content of the starting material. As heating progresses more and more mesophase is produced and the viscosity of the system starts to rise until around 500-550° C. a solid mesophase or 'semicoke' is formed. This is the bonding phase, i.e. carbon bond in the refractory system. Factors which promote the formation of the semicoke, i.e. increasing the coke yield include; a high aromatic content of the pitch (coal tar has a greater aromatic content than petroleum pitch), reducing the amount of volatiles lost during the initial heating and promoting the reactions which join the aromatic molecules together. The latter can be achieved by either oxidising the pitch, which promotes dehydrogenation and the joining together (polymerization) of aromatic rings, or reacting it with chlorine or sulphur which combine with hydrogen, thus removing the hydrogen from the system as HCl or $H_2S$.

In the present invention the binder is preferably produced from a starting material comprising one or more organic compounds, for example, crude oil, coal or a synthetic aromatic polymer (e.g. phenolic resin). The binder preferably comprises a treated or untreated pitch and/or tar (e.g. coal tar) and/or synthetic phenolic resin (e.g. novolac or resole). The pitch and/or tar and/or synthetic phenolic resin is preferably in a powder or granular form. The pitch and/or tar and/or synthetic phenolic resin may be treated in order to create the mesophase in the pitch and/or tar and/or synthetic phenolic resin, or to increase the proportion of mesophase already present in the pitch and/or tar and/or synthetic phenolic resin.

The starting binder material incorporated in admixture with the refractory particles or in the slurry used to make the filter of the present invention can, if desired, be free from mesophase or can contain mesophase. Preferably an amount of mesophase in the range 0-50 wt % based on total binder is present in the starting binder. During the firing of the filter, it is preferred that the binder already contains and/or develops a quantity of mesophase in the range 5 to 60%, for example 10 to 50%, more preferably 15 to 45% for example 20 to 45% based on the weight of the binder. The determination of the amount of mesophase present can be conducted in accordance with ASTM D 4616-95 (Reapproved 2000).

A particularly preferred binder comprises a material supplied by Rütgers VFT AG, Germany, under the trade mark RAUXOLIT. The RAUXOLIT is available in a variety of forms such as liquid, granules and powders. More preferably, the binder comprises RAUXOLIT FF 100 (powder). RAUXOLIT is believed to be a pitch/tar type product prepared from synthetic materials rather than from coal tar or petroleum pitch. Other materials with similar softening points to that of the RAUXOLIT FF are known, such as coal tar pitch 140 from Koppers in the US, but the latter, as the name suggests, is derived from coal. It is preferred to use a solid synthetic particulate pitch as the binder.

Aromatic polymers which can be prepared as dispersions in water, such as alkali phenolic resins may also be used as the binder. Other suitable polymers are novolak phenolic resins which are generally employed as powder mixtures with hexamine. An example of a suitable resin is the commercially available phenolic resin known as "Rutaphen F type" supplied by Bikelite, Germany.

It is preferred to use a binder containing from 0 to 50 weight %, preferably 0 to 20 wt % (based on total binder) of mesophase in the process of the present invention for making the filter material. Thus, in the present invention the bonding of the refractory particles is preferably achieved with the carbon matrix in the form of semicoke. The semicoke is preferably formed by heating coal tar or pitches, petroleum tar or pitches or synthetic aromatic polymer to cause the formation of at least some so-called "mesophase". The liquid or semi-liquid mesophase coats the surface of the refractory particles, and the mesophase is then converted on firing to form the carbon matrix of semicoke.

According to a preferred aspect, the invention provides a process of producing a refractory article, especially a filter for molten metal, comprising:
(a) forming a slurry of a particulate refractory material, and a particulate binder comprising mesophase, in a liquid carrier;
(b) forming the slurry into a desired shape; and
(c) firing the shaped slurry.

In the manufacture of filters in accordance with the process of the present invention, thermoplasticity of the defined carbon-rich materials can produce the result that, during the firing of, for example, a moulded article comprising a mixture of a pitch, e.g. a mesophase-containing pitch, and refractory particles, the article can have a tendency to lose its shape, e.g. it can slump or distort, due to the softening of the material (which may or may not include mesophase at this stage). Any mesophase present or generated in the heated carbon-rich material also can also exhibit thermoplastic properties. Accordingly, in the present invention it is preferred to reduce the thermoplastic properties of the material, including any mesophase which may be present therein, by treating it to one or more stabilisation steps before using it as a binder in the process of the present invention.

Stabilisation of the carbon-rich materials, including any mesophase present in or generated in the pitch or the tar, or in the pyrolysed aromatic polymer, can be achieved, for example, by heat treatment thereof in the presence of air or oxygen and/or treatment with an oxidising agent such as, for example, nitric acid. The stabilisation tends to result in the carbon-rich material, including any mesophase therein, behaving more like a thermosetting resin rather than a thermoplastic material.

A preferred method of stabilising the carbon-rich material, for example a pitch and/or coal tar and/or pyrolysed synthetic phenolic resin, is heat treatment in the presence of oxygen. The carbon-rich starting material is heated (above room temperature) preferably to a temperature less than 600° C., more preferably to a temperature in the range 100-500° C., even more preferably in the range 150-400° C., e.g. approximately 180° C. The heating is conducted in the presence of oxygen, e.g. air is suitable.

A preferred method of stabilising the carbon-rich material, for example, a pitch and/or coal tar and/or pyrolysed synthetic phenolic resin is by treatment with an acid or an oxidising agent or with both. Preferably an oxidising acid is used, for example, nitric acid.

Thus in one particular embodiment of the present invention there is provided a method of producing a starting material, the method comprising oxidising a resin such as a synthetic resin, pitch or tar with an oxidising agent and heat treating the oxidised resin thereby polymerising the resin and producing the starting material. In this particular embodiment the oxidising agent may comprise one or more acids, for example one or a combination of inorganic and/or organic acids. Alternatively the oxidising agent may comprise a non-acid oxidising agent. The oxidising agents or acids are, for example, nitric acid, hydrochloric acid, phosphoric acid, nitrous acid, chromic acid, hypochloric acid, or hydrogen peroxide. Preferably the oxidised resin is heated to a temperature up to 350° C. for several hours, preferably in the absence of air. The starting material can be used as the carbon-rich stabilised material for making the filter in the process of the present invention, with or without further stabilisation.

Examples of suitable oxidising agents or acids include, but are not restricted to, nitric acid, hypochlorous acid, sulphuric acid, chromic acid or mixtures thereof. The treatment with oxidising agent and/or acid is preferably carried out in aqueous solution. For example nitric acid solutions containing 10-80% by volume, more preferably 15-70% by volume, provide satisfactory results. The use of concentrated nitric acid is preferred. The nitric acid treatment can be carried out, for example, by heating the carbon-rich starting material (e.g. a pitch and/or tar and/or pyrolysed synthetic phenolic resin) in the nitric acid, for example for several hours. After heat and/or nitric acid treatment, the carbon-rich material (e.g. pitch and/or tar and/or pyrolysed synthetic phenolic resin) may require grinding and/or crushing (e.g. using a ball mill) to reduce the particle size, (for example to below 50 microns in diameter) since some agglomeration may occur during such treatment.

As mentioned above, the binder preferably comprises a treated or untreated carbon-rich material (e.g. a pitch and/or tar and/or synthetic phenolic resin). It is preferred to use such materials already containing at least some mesophase, or to generate mesophase in the said material in preparing the binder. Some carbon-rich materials (e.g. pitches and/or tars and/or synthetic phenolic resin) need to be heat treated if it is desired that mesophase should be present in the binder and others may need to be so-treated if it is desired to increase the proportion of mesophase already present therein (e.g. in a pitch and/or tar and/or pyrolysed synthetic phenolic resin). However, some carbon-rich materials (e.g. pitches and/or tars) may already comprise a significant proportion of mesophase and hence require no pre-treatment to create or increase the amount of mesophase prior to use as a binder material in the process of the present invention. Whilst it may be advantageous to use a binder already containing mesophase, it is preferable that high mesophase containing binders are not employed in the present invention. If high mesophase binders are employed, the material is found to have a higher softening temperature and higher viscosity when melted which reduces its effectiveness in coating the surface of the refractory particles.

It has been observed above that a moulded article comprising a mixture of binder and refractory particles can have a tendency to lose its shape, e.g. it can slump or distort, due to the softening of the carbon-rich material (including any mesophase present in the binder or the mesophase formed on heating). Another method of reducing or eliminating this tendency is stabilise the carbon-rich material (including any mesophase present therein) in-situ during heat treatment or firing using a polyfunctional chemical compound, for example a polymer bearing a plurality of functional groups, preferably hydroxyl groups or carboxylate groups. One such compound that has been found particularly effective is polyvinyl alcohol (e.g. the polymer prepared by the hydrolysis of polyvinylacetate). Commercially available polyvinyl alcohol varies in its degree of hydrolysis and the degree of polymerisation. It has a large number of reactive alcohol (—C—OH) groups along its chain length. A preferred form of polyvinyl alcohol is that supplied by Zschimmer & Schwarz GmbH & Co., Germany, under the trade mark OPTAPIX PAF 35. The material is supplied and can be used as a 35% (by weight) solution or diluted (e.g. to a 20% solution) prior to use. Other compounds that can be advantageously employed are carbomethoxy-substituted oligophenyls, carbomethoxy-substituted benzyl esters or a combination of these two compounds. The use of these compounds to reduce deformation of articles moulded using pitch as binder is disclosed in U.S. Pat. No. 4,877,761, in the name of Chimel et al.

The polyfunctional compound, e.g. the polyvinylalcohol, is preferably included in the slurry composition employed to make the filter material of the present invention. The amount of polyfunctional compound employed is preferably in the range 0.1 to 3.0 weight % more preferably 0.3 to 1.5 wt %, most preferably 0.5 to 1.0 wt % based on the weight of the solids in the slurry.

The polyfunctional compound is believed to promote crosslinking of the binder material and thus cause stabilisation of the shape of the formed or moulded filter during the heating and firing thereof.

The polyfunctional compound can be employed to assist in stabilising the binder regardless of whether the binder material has been subjected to other stabilisation methods, e.g. nitric acid treatment or oxidation with air at elevated temperature.

The liquid carrier in the slurry can be any suitable liquid diluent, for example water, methanol, ethanol, light petroleum. However, water is generally the preferred carrier as it provides slurries having good coating properties and is environmentally safe.

Other materials that can be incorporated in the slurry comprising the binder and the refractory particles used in the present invention include suspension aids, anti-foaming agents, humectants and dispersion agents. The use of such materials in the preparation of filters using slurry coating of a disposable former is known in the art. The concentrations of such additives, if any, in the slurry, based on the total weight of solids can be, for example, as follows:

Suspension aids—0 to 1.0 wt %, e.g. 0.1 wt %
Anti-foaming agents—e.g. silicone anti-foam—0 to 1.0 wt %, e.g. 0.3 wt %
Polymeric stabiliser—e.g. polyvinyl alcohol solution—0 to 10.0 wt %, e.g. 3.0 wt % of a 20% aqueous solution
Humectants—0 to 1.0 wt %, e.g. 0.5 wt %
Dispersants—e.g. ammonium lignosulphonate—0 to 1.0 wt %, e.g. 0.6 wt %

The dispersant, ammonium lignosulphonate and the polymer material, polyvinyl alcohol also function together as so-called 'green binders'. For the manufacture of certain refractory articles such as filters, these 'green binders' ensure that the refractory powders and the binder remain on the disposable former, e.g. the polyurethane foam after drying without crumbling away or cracking and that the unfired filter can be handled and can tolerate further processing stages, e.g. spraying, without damage occurring.

The quantity of liquid present in the slurry is preferably such that the relative proportions (in percentage by weight) of the total "solids" to liquid in the slurry are in the range at least 50% solids: no more than 50% liquid; more preferably they are in the range at least 55% solids: no more than 45% liquid; even more preferably they are in the range at least 60% solids: no more than 40% liquid For example, the slurry may comprise approximately 69% solids and 31% liquid.

The disposable former provides as a template for the desired shape of the open-pored porous material which is produced by the process of the present invention. By "disposable" is meant that the material from which the former is fabricated is degraded and is substantially lost to the atmosphere by combustion or volatilisation when the coated former is fired. The former can be, for example, a three dimensional lattice-work built up from reticulated layers, an extruded net compressed to form an open reticulated structure, or a reticulated polymeric foam. Preferably the disposable former is reticulated polyurethane foam. Reticulated polyurethane foams suitable for use as disposable formers for molten metal filters are well known in the art. Suitable foam material is supplied by 1. Kureta GmbH & Co., D-35260 Stadtallendorf, Germany; 2. Eurofoam Deutschland GmbH., Troisdorf, Germany and 3. Caligen Europe B.V., Breda, Netherlands.

The coating is preferably applied to the disposable former using means well known in the art. Thus, for example, a polyurethane foam former can be dipped in or sprayed with the slurry and then passed between pairs of rollers to adjust the distribution and amount of slurry present on the foam.

Thus, in a preferred method of forming a filter in accordance with the present invention the filter may, for example, be formed in a conventional manner known to the skilled person, for example, by impregnating a polymeric (usually polyurethane) foam with a slurry (preferably an aqueous slurry) of a composition comprising a particulate refractory material and a binder, and drying and firing the impregnated foam to drive off the liquid, to harden the composition, and to burn off the polymeric foam, thereby creating a refractory foam structure which may be used as a filter, e.g. for molten metal. The step of forming the slurry into the desired shape, preferably therefore comprises impregnating a polymeric foam with the slurry (e.g. by spraying the slurry onto and into the foam and/or by rolling the slurry onto and into the foam). The final steps of the process preferably comprise drying and firing the impregnated foam to drive off the liquid and any other volatiles, to harden the refractory/binder composition, and to burn off the polymeric foam.

The preferred filter forming method according to the present invention differs from conventional methods, however, in that the composition includes the defined binder and refractory particle composition, preferably comprising mesophase in the binder, and the temperature at which the impregnated foam is fired is generally lower than conventional firing temperatures. As already mentioned, the firing temperature according to the invention is preferably no higher than 800° C., more preferably no higher than 700° C., even more preferably no higher than 650° C., for example approximately 600° C. For example, the filter may be fired for a total of 5 hours at heating and cooling rates (from and to ambient temperature) of approximately 300° C. per hour, with a maximum firing temperature of 600° C. (which the filter may experience, for example, for approximately 1 hour).

After the disposable former has been coated, it is dried and then subjected to further coating if desired until the requisite thickness of slurry has been applied.

The coated former is then preferably heated to a higher temperature to drive off any residual volatiles, and is finally fired at a temperature at least sufficient to convert the binder to a carbon matrix, preferably comprising the semi coke. It is preferred to fire the coated former in the absence of oxygen.

The firing of the article substantially in the absence of oxygen generally causes some or all of the carbon-rich material (i.e. the binder), comprising at least some mesophase which is either already present, or is generated by the heating, to pyrolyse (at least partially), generally forming the material known as "semi coke". This semi coke forms a matrix which bonds the particulate refractory particles together, forming an article comprising refractory material and carbon as the major components. In the fired refractory article, some or all of the binder is derived from mesophase, and will generally comprise semi coke. Articles containing mesophase or those that generate mesophase are preferably fired in the absence of oxygen.

The articles made by the processes of the present invention are produced by firing the shaped composition, with or without a disposable former, comprising refractory particles and binder at a temperature preferably no higher than 800° C., more preferably no higher than 700° C., even more preferably no higher than 650° C., for example approximately 600° C. The firing to form the article is preferably carried out substantially in the absence of oxygen, e.g. in an inert or "non-oxidising" atmosphere, such as nitrogen or argon for example, or under vacuum, or under a "reducing atmosphere", such as hydrogen and/or carbon monoxide and/or coal gas (i.e. a mixture of methane and hydrogen). Additionally or alternatively, the firing of the shaped slurry may be carried out in the presence of a reducing agent, for example carbon (graphite), to scavenge some or all of the oxygen which may be present. The shaped slurry or coated former is normally at least partially dried, e.g. at a temperature between 100° C. and 200° C. (e.g. approximately 150° C.) prior to being fired, but it may be fired without significant pre-drying.

The firing of the article will normally be carried out in an oven or furnace, but additionally or alternatively other forms of heating may be used, for example microwave or radio frequency heating.

In a further embodiment of the present invention the firing of the shaped filter material is carried out in two stages. It has been found that this two stage process leads to the production of filter materials which have improved compressive strength.

In this embodiment of the present invention the unfired filters comprising the shaped slurry are subjected to a two-step firing protocol:
1. the filters are placed in a container through which a controlled supply of air is passed and heated gradually to a temperature in the range 340 to 360° C., for example at a heating rate of 60 to 100° C. per hour
2. the air supply is turned off and the heating continued at a rate of approximately 200° C. per hour up to a temperature in the range 675 to 725° C. then holding at this temperature for a further period of 50 to 70 minutes.

In this two-step firing process the binder is preferably a synthetic pitch, most preferably the commercially available RAUXOLIT material referred to above.

Thus, for example, it has been found that good results are obtained when conducting the firing as follows. A number of 'green', unfired filters, comprising reticulated polyurethane foam impregnated with a slurry containing the refractory particles and the mesophase-containing, or mesophase generating binder, are placed on open mesh metal trays and then placed on a metal rack which holds a number of trays. The rack stands on a shallow metal trough and a metal cover is lowered down over the rack which makes a tight seal with the trough at the bottom. Graphite is also sprinkled into the trough to react with any air which may leak between the cover and the trough. This then constitutes the firing box for the filters. In the initial part of the firing cycle from room temperature to 350° C., at a rate of temperature increase between 60-100° C. per hour, air is blown into the box through at a rate of 15 litres per minute. When the temperature inside the box reaches 340-350° C., the air supply is turned off. Measurements made with an oxygen meter show that during the time that air is blown into the box the oxygen level inside is between 2 and 6%. When the air is stopped the oxygen level immediately drops to zero.

It is believed that the air in the box during the first part of the firing reacts with the binder in such a manner that a higher yield of carbon is produced when the final firing takes place.

In a firing conducted without injecting air, the filter compression strengths, measured using a Hounesfield Tensometer, averaged only 300-500 newtons, whereas those fired with air injected, had compression strengths averaging 700-800 newtons. During firing the filters lose weight due to the loss of volatile organic compounds. Without air the loss is 22%, whilst with air, it is 18% indicating a higher coke yield during firing and consequently higher strength.

The filters of the present invention can be made advantageously with lower density and lower thermal mass than conventional prior art filters for steel (for example formed from glass-bonded zirconia), and because of this, the filter abstracts less heat from the metal during pouring. Consequently, steels such as plain carbon steel which is often poured at temperatures not significantly higher than the liquidus temperature generally do not have to be superheated in order for the metal to pass through the filter without freezing. Therefore, for example, plain carbon steel may be poured at much lower temperatures than conventionally. This provides the economic and environmental benefits that less energy needs to be used.

The process for making the filter material according to the present invention has the advantages of requiring less energy consumption, being easy to use, requiring relatively low pressures and low temperatures, and being capable of producing very thin sections if required (for example in the order of 0.3 mm). Moreover, the preferred process is water based and the processing time is relatively short.

It is possible to make other refractory articles using the compositions disclosed above for forming the porous filter. Thus, compositions comprising the refractory particles and the defined binder, can be used to make a variety of other refractory products. An example of such a product is a feeder sleeve, for retaining a reservoir of molten metal for supplying to a mould cavity as a metal casting within the cavity shrinks as it cools and solidifies.

For the avoidance of doubt, it is to be understood that features (including material compositions) described with reference to a particular aspect of the invention are applicable to each aspect of the invention.

The invention will now be further described with reference to the following Examples.

EXAMPLE 1

Five refractory filler systems were prepared using the RAUXOLIT FF 100 commercially available binder as follows:
1.a Rauxolit: graphite
1.b Rauxolit: alumina
1.c Rauxolit: alumina/graphite ($Al_2O_3$:graphite 3:1)
1.d Rauxolit: silicon carbide
1.e Rauxolit: zircon.

A number of 100×100×25 mm filters were produced from these formulations. The percentage of refractory particles ranged from 55 to 75% and the RAUXOLIT from 45 to 25%. The firing temperatures ranged from 400 to 600° C.

These filters were then tested with molten steel using a direct impingement test in which 100 kg of high alloy steel, typically Cr8M grade, at a temperature of 1600-1610° C. is poured from a bottom-pour ladle, fitted with a 29 mm nozzle, down a 700 mm sprue onto the face of a filter, which is supported on two opposing sides in a print in a resin-bonded sand mould. The test provides a measure of the mechanical strength of the filter from the initial metal impact, thermal shock resistance, the mechanical strength at temperature, the resistance to chemical attack from the chemically aggressive alloy and the resistance to erosion from the very fluid steel.

Two recipes performed the best in this test, the alumina/graphite and zircon recipes with RAUXOLIT levels of 35 and 25% respectively fired at 600° C. Neither filter recipes exhibited any cracks or erosion.

Of the two recipes, however, the easiest to process was the alumina/graphite recipe.

EXAMPLE 2

For the manufacture of a carbon bonded graphite filter for molten aluminium filtration, approximately 40% by weight of nitric acid-treated RAUXOLIT FF 100 binder was employed. The nitric acid treatment comprised adding 20 wt % of concentrated nitric acid to the RAUXOLIT FF 100 powder and mixing thoroughly for 1 to 2 hours. The mixture was then heated in an oven to a temperature in the range 300 to 350° C. for approximately 12 to 18 hours and then allowed to cool. The product was then washed with water to remove any nitric acid residues and then dried in an oven at 120° C. The resultant lumpy product was then crushed in a ball mill.

The nitric acid and heat-treated RAUXOLIT FF 100 binder was mixed with approximately 60 wt % graphite powder. The slurry was made by adding approximately 40 wt % water (based on weight of solid binder and refractory) and up to a total 2 wt % (based on weight of solid binder and refractory material) of organic binder, thickener and suspension agent (polyvinyl alcohol solution, xanthan gum and ammonium lignosulphonate).

This slurry was used to impregnate a polyurethane foam slab of dimensions 50 mm×50 mm×15 mm. On firing to 600° C. for 1 hour at a firing rate of 300° C. per hour in a metal box to exclude air, a product with an open, porous structure was obtained suitable for use as a filter. Such a filter was used successfully in filtering aluminium at a temperature of 800° C., and gave a comparable performance to a conventional glass bonded commercial ceramic filter (supplied by Foseco under the trade name SIVEX FC) manufactured by firing at a temperature in the range 1000 to 1100° C.

EXAMPLE 3

For the manufacture of a carbon bonded alumina and graphite filter for iron filtration, approximately 30% by weight of nitric acid and heat-treated RAUXOLIT FF 100 binder, prepared as in Example 2, was mixed with approximately 50% alumina powder and approximately 20% graphite powder. Slurry was made by adding approximately 40 wt % water (based on weight of solid binder and refractory) and up to 2 wt % (based on weight of solid binder and refractory material) organic binder, thickener and suspension agent (polyvinyl alcohol solution, xanthan gum and ammonium lignosulphonate). This slurry was used to impregnate a polyurethane foam slab of dimensions 75 mm×75 mm×20 mm. Upon firing to 600° C. for one hour at a heating rate of 300° C. per hour in a metal box to exclude air, a porous material suitable for use as a metal filter was obtained. This filter was used successfully to filter molten iron at 1,450° C. and gave a comparable performance to a conventional glass bonded commercial ceramic filter (supplied by Foseco under the trade name SEDEX) manufactured by firing at a temperature in the range 1100 to 1200° C.

The invention claimed is:

1. A process for making a carbon bonded filter suitable for filtering molten metal, said filter comprising particles of refractory material bonded together by a bonding material consisting essentially of carbon said process comprising:
   (i) forming a slurry comprising (a) particles of a refractory material, (b) a binder and (c) a liquid carrier,
   (ii) coating a disposable former with the slurry,
   (iii) drying the coated former, and
   (iv) firing the coated former to convert the binder to the bonding material consisting essentially of carbon, wherein the binder is selected from one or more of the following classes of aromatic materials: pitches, tars and aromatic organic polymers that degrade to form carbon on pyrolysis.

2. A process as claimed in claim 1, wherein the pores of the disposable former comprise a random distribution of interconnecting passages.

3. A process as claimed in claim 1, wherein the carbon of the bonding material is in the form of a coke or semi-coke.

4. A process for making a carbon bonded filter suitable for filtering molten metal said filter comprising an open-pored porous material comprising particles of refractory material embedded in and bonded together by a bonding material, said bonding material consisting essentially of a carbon matrix having a three dimensional lattice structure defining interconnecting passages extending through the carbon matrix for the passage of molten metal therethrough, said process comprising:
   (i) forming a slurry comprising (a) particles of a refractory material, (b) a binder and (c) a liquid carrier,
   (ii) coating a disposable former having pores which comprise interconnecting passages with a slurry,
   (iii) drying the coated former, and
   (iv) firing the coated former to produce the filter, wherein the binder is selected from one or more of the following classes of aromatic materials: pitches, tars and aromatic organic polymers that degrade to form carbon on pyrolysis.

5. A process as claimed in claim 4, wherein the disposable former has a random distribution of interconnecting passages, resulting in the interconnecting passages defined by the three dimensional lattice structure being irregular.

6. A process for making a green filter which when fired is a carbon bonded filter suitable for filtering molten metal, said process comprising:
   (i) forming a slurry consisting essentially of (a) particles of a refractory material, (b) a binder which is selected from one or more of the following classes of aromatic materials: pitches, tars and aromatic organic polymers that degrade to form carbon on pyrolysis, and (c) a liquid carrier,
   (ii) coating a disposable former with a slurry, and
   (iii) drying the coated former.

7. A process as claimed in claim 1, further comprising applying one or more additional coats of a material selected from the group consisting of a refractory material and a binder, and drying the one or more additional coats.

8. A process as claimed in claim 7, wherein a liquid carrier is present.

9. A process as claimed in claim 4, further comprising applying one or more additional coats of a material selected from the group consisting of a refractory material and a binder, and drying the one or more additional coats.

10. A process as claimed in claim 9, wherein a liquid carrier is present.

11. A process as claimed in claim 6, further comprising applying one or more additional coats of a material selected from the group consisting of a refractory material and a binder, and drying the one or more additional coats.

12. A process as claimed in claim 11, wherein a liquid carrier is present.

* * * * *